United States Patent
Nagl et al.

(10) Patent No.: US 9,475,519 B2
(45) Date of Patent: Oct. 25, 2016

(54) STEERING STOP

(71) Applicant: AUDI AG, Ingolstadt (DE)

(72) Inventors: Martin Nagl, Rennertshofen (DE); Ulrich Pfeiffer, Karlskron/Probfeld (DE); Tilo Koch, Ingolstadt (DE); Thomas Klinger, Ingolstadt (DE); Anne Satzke, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/913,583

(22) PCT Filed: Aug. 13, 2014

(86) PCT No.: PCT/EP2014/002228
§ 371 (c)(1),
(2) Date: Feb. 22, 2016

(87) PCT Pub. No.: WO2015/024643
PCT Pub. Date: Feb. 26, 2015

(65) Prior Publication Data
US 2016/0200347 A1    Jul. 14, 2016

(30) Foreign Application Priority Data
Aug. 23, 2013  (DE) .................. 10 2013 014 121

(51) Int. Cl.
*B62D 5/00*    (2006.01)
(52) U.S. Cl.
CPC .............. *B62D 5/001* (2013.01); *B62D 5/005* (2013.01)
(58) Field of Classification Search
CPC ....... B62D 5/001; B62D 5/005; B62D 5/006
USPC ......................................................... 180/403
See application file for complete search history.

(56) References Cited

U.S. PATENT DOCUMENTS

| | | | |
|---|---|---|---|
| 6,336,519 B1 * | 1/2002 | Bohner ................... | B62D 5/30 180/403 |
| 9,004,219 B2 * | 4/2015 | Rosenmaier ........... | B62D 5/006 180/403 |
| 2012/0305328 A1 | 12/2012 | Rombold | |
| 2013/0131920 A1 | 5/2013 | Meitinger et al. | |
| 2013/0249252 A1 | 9/2013 | Schmid et al. | |
| 2014/0028007 A1 | 1/2014 | Pfeiffer et al. | |
| 2014/0110996 A1 | 4/2014 | Klinger | |
| 2014/0195115 A1 | 7/2014 | Müller et al. | |

FOREIGN PATENT DOCUMENTS

| | | |
|---|---|---|
| DE | 198 42 624 A1 | 4/2000 |
| DE | 100 32 180 A1 | 1/2002 |
| DE | 10 2008 021 973 A1 | 11/2009 |
| DE | 10 2008 048 523 A1 | 3/2010 |
| DE | 10 2010 001 744 A1 | 8/2011 |
| DE | 10 2010 041 738 A1 | 4/2012 |
| EP | 1 334 896 A2 | 8/2003 |
| EP | 2 631 154 A2 | 8/2013 |
| WO | WO 02/12052 A1 | 2/2002 |
| WO | WO 2014/076733 A1 | 5/2014 |

OTHER PUBLICATIONS

International Search Report issued by the European Patent Office in International Application PCT/EP2014/002228.

* cited by examiner

*Primary Examiner* — Tony Winner
*Assistant Examiner* — Felicia L Brittman
(74) *Attorney, Agent, or Firm* — Henry M. Feiereisen LLC

(57) ABSTRACT

A steering stop for a steer-by-wire steering system, includes a steering shaft for functionally connecting to a steering wheel, wherein a pressure chamber is provided for each direction of rotation of the steering shaft. A rotation of the steering shaft produces a reduction in the volume of a corresponding pressure chamber, and the steering stop also comprises a hydraulic valve such that resistance against a further rotation of the steering shaft is generated by the operation of said hydraulic valve when predetermined environmental conditions are met.

13 Claims, 1 Drawing Sheet

STEERING STOP

CROSS-REFERENCES TO RELATED APPLICATIONS

This application is the U.S. National Stage of International Application No. PCT/EP2014/002228, filed Aug. 13, 2014, which designated the United States and has been published as International Publication No. WO 2015/024643 and which claims the priority of German Patent Application, Serial No. 10 2013 014 121.4, filed Aug. 23, 2013, pursuant to 35 U.S.C. 119(a)-(d).

BACKGROUND OF THE INVENTION

The invention relates to a steering stop for use in steer-by-wire steerings, in particular in non track-bound vehicles.

In steer-by-wire steerings no direct mechanical coupling between the steering wheel and the steered wheels exists. Instead the steering handle and/or the angular speed steering wheel is measured by sensors and the wheels are correspondingly turned in by actuators. Such arrangements are known from DE 10 2010 041 738A1 or DE 10 2008 021 973.A1.

In steer-by-wire steerings the direct feedback between the steering angle input by the driver via the steering wheel and the actually resulting steering angle at the wheel is therefore not available. Correspondingly the driver does not receive any feedback regarding whether the steering transmission is already at the stop in case of a strong steering. In case of a freely rotatable steering wheel infinitely great steering angles can thus be generated without the steering transmission being able to realize these steering angles.

SUMMARY OF THE INVENTION

It is an object of the present invention to provide a steering wheel stop for use in steer-by-wire, in which the user receives a haptic feedback when reaching the maximally possible steering angle. In particular it is taken into account that different driving conditions may require different maximal turn-in angles of the wheels and different transmission ratios from the steering wheel position to the wheel turn-in angle may be required.

The object is solved with the features of the independent claim. Advantageous refinements are set forth in independent claims.

The steering wheel stop for a steer-by-wire steering system includes a steering shaft for functional connection with a steering handle, in particular a steering wheel, wherein a pressure chamber is provided for each direction of rotation of the steering shaft. A rotation of the steering shaft causes, in particular via a coupling with a hydraulic piston, a reduction of the volume of an assigned pressure chamber and the steering stop includes a hydraulic valve in order to generate a resistance against a further turning of the steering shaft by switching a hydraulic valve when predetermined environmental conditions are given. Instead of coupling the steering shaft with a hydraulic piston, which is described in more detail in the following preferred embodiment, the steering wheel can also be coupled with the hydraulic cylinder and the volume reduction can be caused by a stationary and double-acting hydraulic piston. Naturally, the steering shaft can hereby be rotated in two directions. The predetermined environmental conditions are in particular caused by the rotation of the steering shaft. The resistance against the rotation of the steering shaft means in particular that the switched, i.e., closed hydraulic valve, prevents a (further) outflow of the hydraulic fluid from the pressure chamber, thereby preventing rotation in this direction. In a steering wheel that has no stops against a free (endless) rotation, this makes it possible to provide the driver with a feedback regarding when the maximally possible steering or turning-in angle is reached.

In a steer-by-wire steering no mechanical coupling or hydraulic coupling via transmission stages or the like to mechanical components that set the wheel turn-in angle, for example a steering rod, is present. Rather the rotation of the steering angle is converted into an electronic signal via which turning-in of the wheels is accomplished.

The mentioned environmental conditions can in particular be generated by a defined or definable angular position of the steering shaft or an orientation or position of a component of the steering wheel stop and/or a defined or definable volume of a pressure chamber and/or a defined or definable inflow or outflow into or out of one of the pressure chambers. A determination of the angular position of the steering wheel is advantageous in order to reproducibly generate the same stop for the steering wheel. Generating the stop of the steering wheel in dependence on a position and/or orientation of the piston rod provides the driver with a feedback of the vehicle situation at hand.

Further at least a part of the pressure chamber can be a component of the steering shaft or can be directly coupled with the steering shaft. In this way the drive-by-wire function is realized by a spatial separation from the hydraulic system, which is used for turning the wheels and a direct feedback from the pressure increase in the pressure chamber to the driver is improved.

In particular a hydraulic system is arranged between the two pressure chambers in order to enable a fluid low from one of the pressure chambers into the other pressure chamber in dependence on the switching position of the at least one hydraulic valve. Because the total volume of both pressure chambers is constant in every position of the hydraulic piston this allows generating a closed hydraulic system in a simple manner.

In particular when turning the steering shaft in a first direction, the volume of a first pressure chamber is reduced and the hydraulic valve is configured to prevent a further outflow out of the first pressure chamber when further turning the steering shaft in the first direction. This circumstance also applies correspondingly to the second pressure chamber.

Preferably a hydraulic valve function is provided for each pressure chamber, wherein both hydraulic valve functions are in particular arranged in a common hydraulic valve, thereby creating a same stop or end position for the steering wheel in both directions of rotation.

Also in particular a one-way function can be provided, so that when the outflow out of one of the pressure chambers and rotation of the steering shaft in a first direction of rotation is limited by switching the hydraulic valve, an inflow into this pressure chamber remains possible in order to not prevent turning of the steering shaft in the direction opposite to the first direction of rotation. The check valve can be part of the hydraulic valve or can be connected in parallel as a separate assembly.

In particular a reduction of the volume of the one pressure chamber caused by the rotation of the steering shaft corresponds to an identical increase of the volume of the other pressure chamber. In this way no special fluid compensation reservoir is required because the fluid, which flows out of the one pressure chamber can directly flow into the other pressure chamber.

Further a shutoff valve can be arranged in the fluid circuit of the hydraulic system between the pressure chambers, which shutoff valve is functionally separated from the hydraulic valve. The term functionally separated in particular means that the system includes a separate control logic with a separate (electronic) actuating drive and/or a controlled flow section of the fluid is present in the hydraulic circuit between the hydraulic valve and the shutoff valve. This can in particular be an interconnected tube or in the case of design in which the shutoff valve is integrated with the hydraulic valve in one unit, a valve-free flow region can be provided between the valves.

In a concrete embodiment the steering shaft can have a threaded section. Hereby a piston element is operatively engaged with the threaded section of the steering shaft and is supported torsion-stiff against a cylinder which includes the two pressure chambers so that a rotation of the steering shaft causes a corresponding volume change of the pressure chambers.

Further a hydraulic system, which includes the pressure chambers, is fluidly separated from an optionally present hydraulic system for hydraulic setting of the wheel turn-in angle. Thus the hydraulic system of the turning the wheels includes no further piston/cylinder assemblies beyond the first and second pressure chambers.

BRIEF DESCRIPTION OF THE DRAWING

In the following preferred embodiments are described by way of the Figures.

DETAILED DESCRIPTION OF PREFERRED EMBODIMENTS

Figure 1:
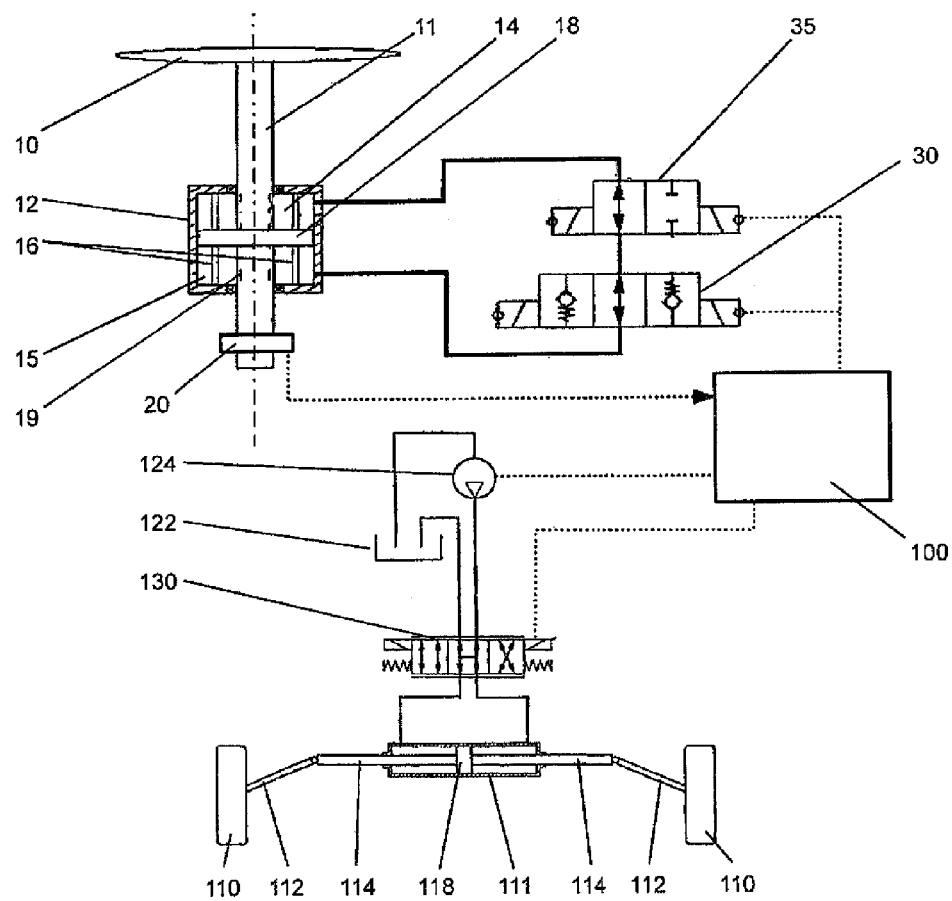
FIG. 1 schematic shows a construction of the steering wheel stop together with the region of the turned-in wheels of a non track-bound motor vehicle and FIG. 2 shows a section of FIG. 1 with an alternative embodiment of the hydraulic cylinder.

A steering handle 10, or more specifically a steering wheel 10, is connected with a steering shaft 11. The steering shaft has threading 19 in a middle section 8. This threading 19, which is preferably an outer threading, engages with a corresponding threading of a hydraulic piston 18. This hydraulic piston 18 is located inside a hydraulic cylinder 12, which is arranged stationary on a vehicle. The steering shaft 11 passes axially through the hydraulic cylinder 12.

The hydraulic piston 18 is supported torsion stiff and axially displaceable relative to the hydraulic cylinder 12. This is achieved in that at least one bolt 16, preferably at least two bolts 16, is connected with the hydraulic cylinder 12 parallel to the longitudinal axis and in particular off-center, and is hereby guided through a bore inside the hydraulic piston 18. In alternative embodiments, a longitudinally extending tongue and groove guide can be provided on the inside of the cylinder 12 as connection with the piston 18.

When the steering is actuated, the piston 18 is displaced by the rotation of the steering shaft 11 in the longitudinal direction of the cylinder, so that the volume of a first pressure chamber 14 and a second pressure chamber 15, which are respectively provided inside the cylinder 12 and which are delimited by the double-acting hydraulic piston, changes. The connecting regions of the hydraulic cylinder 12 with a steering shaft 11 are sealed via ring gaskets. In addition guides are provided between the piston 18 and the bolt 16, which are dimensions so as to be substantially liquid tight. For this purpose gaskets can be used. Also the threaded connection between the piston 18 and the steering shaft 11 is configured substantially liquid tight. The two pressure chambers 14 and 15 are connected with each other via a hydraulic line 25, in which a hydraulic valve 30 and a shutoff valve 35 are arranged. The shutoff valve 35 is also a hydraulically operated valve. The hydraulic valve 30 has three switching positions. In the flow through position fluid flow is permitted in both directions. In the two one-way positions fluid flow is permitted in one direction and is blocked in the opposite direction. The shutoff valve 35 has two switching positions, i.e., a flow through position and a closed position in which fluid flow is interrupted.

A steering transmission can have a further and separate hydraulic system for setting the steering angles of the wheels 110. In alternative embodiments an electric drive can be used. In the hydraulic system a hydraulic pump 124 is provided and a three-way control valve 130, which can be controlled by an electronic control 100, so that the hydraulic fluid flows into a steering cylinder 111. In this way a steering piston 118 can selectively be shifted in the steering cylinder 111 in both directions. The steering piston 118 is connected with a piston rod 114 on both sides, to the ends of which a steering rod 112 is coupled, which is respectively connected with the corresponding wheel 110. In this way the steering angle or turn-in angle of the wheels 110 can be set via the position of the steering piston 118. When turning of the wheels 110 to the left is desired the control 100 switches the three-way valve 130 into the shifting position shown in FIG. 1 on the left hand side in which the fluid moves from the pump 124 into the right chamber of the steering cylinder 111 and thus causes the turning of the wheels. In order to cause turning of the wheels in the opposite direction the control valve 130 is caused to assume the opposite shifting position and the fluid is pumped into the left chamber of the steering cylinder 111.

In the present exemplary embodiment of the invention, the steering angle-/wheel turn-in angle ratio is 2.5 to 1. This means that at a rotational angle of the steering wheel 10 of +900°, starting from the center position, in the one direction the one steering angle can be achieved and of −900° in the other direction the other steering angle can be achieved. The angular sensor 20 measures the respective position of the steering wheel 10 and provides the result to the control 100. At normal driving when no maximal wheel turn-in angle is present, the hydraulic valve 30 is in the flow through position.

When the steering wheel 10 is turned to the right, the hydraulic piston 18 moves upwards and reduces the size of the first pressure chamber 14. When the steering angle of +900° is reached the control 100 switches the hydraulic valve 30 into the first one-way position (right switching symbol of the valve), in which no further fluid can drain from the first pressure chamber 14. The pressure increase resulting therefrom is perceived by the driver as resistance and he immediately obtains the feedback that a maximal wheel turn-in angle is reached. Due to the one-way function of the hydraulic system the driver can steer in the opposite direction and thus reduce the steering angle of the steering wheel 10. Thus the check valve function of the hydraulic valve 30 acts as a one-sided stop for the steering wheel 10. The steering wheel stop is constructed symmetric or identical with regard to both directions of rotation of the steering wheel 10.

Depending on the situation a different steering angle/wheel turn-in angle ratio may be desired. For example the vehicle can have a sporty drive program. In case of a sporty driving the steering is to react more sensitively to the steering angle of the steering wheel. Thus in this case a steering angle of respectively 1.5 rotations, i.e., =+/−540°, can correspond to the maximal wheel turn-in angle. In case of a drive program for off-road drives a different maximal wheel turn-in angle can be predetermined. Also in the case of wheels with different diameters (such as for example summer or winter tires) a changed maximal wheel turn-in angle can be predetermined. Furthermore, the motor control can predetermine a maximally permitted wheel turn-in angle in dependence on the speed. Also in these cases it is desired that the driver receives a changed feedback regarding the maximal steering angle of the steering wheel 10. In these cases the control 100 can bring the hydraulic valve 30 into the corresponding one-way position already at smaller measured steering angles of the angular sensor 20, in order to generate a changed stop for the steering wheel 10.

During driving operation of the vehicle the shutoff valve 35 is always in its open position. When the vehicle is turned off, for example for parking, the control 100 ensures that the shutoff valve 25 assumes its closed position. Because as a result no outflow from either of the pressure chambers 14 and 15 is possible, the steering wheel 10 can thus no longer be turned, which corresponds to the function of a steering wheel lock. For safety reasons it must be excluded that the shutoff 35 assumes the described blocking function during driving. For this reason it is configured separate from the hydraulic valve 30. In alternative embodiments the blocking function can however also be integrated in the hydraulic valve 30 as further switching position.

According to FIG. 1 the hydraulic cylinder 12 is arranged in a center position of the steering shaft 11. Alternatively it may also be arranged at the end of the steering shaft 11 so that it extends into the cylinder 12 only on one side. In this case one of the two gaskets between the cylinder 12 and the steering shaft 11 is not required.

Figure 2:
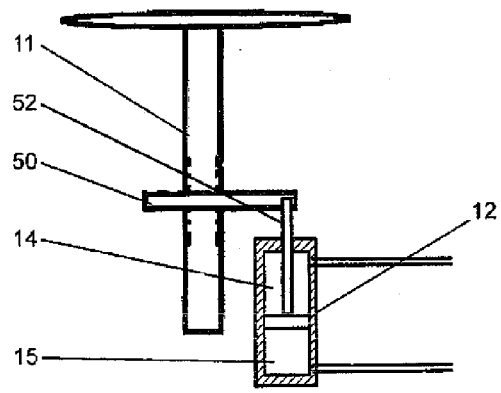

FIG. 2 shows an alternative embodiment of the piston 18. A nut 50 is coupled with the steering shaft 11 via a threading. On this nut 50 a piston rod 52 is fastened and this fastening ensures an anti-rotation support of the nut 50 so that it rotates in longitudinal direction of the steering shaft when the steering shaft 11 rotates. The cylinder 12 is dual action, so that two pressure chambers 14 and 15 result. FIG. 2 also shows two connection lines of the pressure chambers, which as described are connected with each other via the hydraulic valve 30 and the shutoff valve 35. Because in the embodiment of FIG. 2 the volume-flows into and out of the pressure chambers 14, 15 are different when the piston moves, a fluid compensation reservoir (not shown) is required in this case.

The features of different embodiments can be freely combined with each other.

REFERENCE SIGNS 10 steering handle, steering wheel
11 steering shaft
12 hydraulic cylinder, cylinder
14, 15 first and second pressure chamber
16 bolt
18 hydraulic piston
19 threading
20 angular sensor
25 hydraulic line
30 hydraulic valve
35 shutoff valve
50 nut
52 piston rod
100 control
110 wheel
111 steering cylinder
112 steering rod
114 piston rod
118 steering piston
124 hydraulic pump
130 three-way control valve

The invention claimed is:

1. A steering stop excluding a mechanical or hydraulic coupling to mechanical components for turning a steer-by-wire steering system, said steering stop comprising:
   a steering shaft for connection with a steering handle;
   pressure chambers for a hydraulic fluid, one of said pressure chambers provided for each direction of rotation of the steering shaft, wherein a rotation of the steering shaft in one direction of rotation causes a reduction of the volume of one of the pressure chambers and a rotation of the steering shaft in the other direction of rotation causes a reduction of the volume of another one of the pressure chambers;
   a hydraulic valve configured to switch in response to predetermined environmental conditions thereby causing a resistance against a further turning of the steering shaft; and
   a one-way function permitting inflow of hydraulic fluid into one of the pressure chambers in spite of outflow of hydraulic fluid out of the one of the pressure chambers being blocked as a result of rotation of the steering shaft in a first direction of rotation, said inflow preventing blockage of rotation of the steering shaft in a second direction of rotation opposite the first direction of rotation.

2. The steering stop of claim 1, wherein the steering handle is a steering wheel.

3. The steering stop of claim 2, further comprising a piston coupled with the steering wheel so that a turning of the steering wheel causes a movement of the piston in the pressure chambers, said movement causing the reduction of the volume in the pressure chambers wherein the steering wheel is coupled with a hydraulic piston received in the pressure chambers and the reduction of the volume of the pressure chambers.

4. The steering stop of claim 1, wherein the environmental conditions include at least one member selected from the group consisting of a defined or definable angular position of the steering shaft, an orientation or position of a component of the steering wheel stop, a defined or definable volume of the pressure chambers and a defined or definable inflow into or outflow out of the pressure chambers.

5. The steering stop of claim 1, further comprising two said hydraulic valves, with one of the two hydraulic valves provided for each of the pressure chambers.

6. The steering stop of claim 5, wherein the two hydraulic valves are arranged in a common hydraulic valve.

7. The steering stop of claim 1, further comprising a hydraulic system arranged between the pressure chambers in order to enable a fluid flow from the one pressure chamber into the other pressure chamber depending on the switching position of the hydraulic valve.

8. The steering stop of claim 7, further comprising a shutoff valve arranged in a fluid circuit of the hydraulic system between the pressure chambers.

9. The steering stop of claim 8, wherein the shutoff valve is functionally separated from the hydraulic valve.

10. The steering stop of claim 1, wherein said hydraulic valve is configured to prevent a further outflow of the hydraulic fluid from the first pressure chamber when reaching a threshold value, thereby causing the resistance against a further turning of the steering shaft in the first direction.

11. The steering stop of claim 1, wherein a decrease of the volume of the one of the pressure chambers resulting from the rotation of the steering shaft corresponds to an identically sized volume increase of the other pressure chamber.

12. The steering stop of claim 1, further comprising a cylinder including the pressure chambers, and a piston element in engagement with a threaded section of the steering shaft, said piston element being supported torsion stiff against the cylinder so that a rotation of the steering shaft causes a volume change of the pressure chambers.

13. The steering stop of claim 1, wherein the chambers are part of a hydraulic system which is fluidly separated from a hydraulic system for hydraulically truing the wheels.

* * * * *